United States Patent
Suzuki

(10) Patent No.: US 6,839,568 B2
(45) Date of Patent: Jan. 4, 2005

(54) USER SETTING INFORMATION MANAGEMENT METHOD AND MANAGEMENT SYSTEM FOR PORTABLE TELEPHONE

(75) Inventor: Masaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 514 days.

(21) Appl. No.: 09/989,549

(22) Filed: Nov. 20, 2001

(65) Prior Publication Data
US 2002/0090971 A1 Jul. 11, 2002

(30) Foreign Application Priority Data
Nov. 22, 2000 (JP) ........................... 2000/355914

(51) Int. Cl.$^7$ ............................. H04M 1/00
(52) U.S. Cl. .................. 455/550.1; 455/412.1; 455/418; 707/204; 707/101
(58) Field of Search ............... 455/550.1, 558, 455/412.1, 418, 403, 419; 707/204, 200, 100, 101

(56) References Cited

U.S. PATENT DOCUMENTS

| | | | |
|---|---|---|---|
| 5,109,505 A | | 4/1992 | Kihara |
| 5,519,871 A | | 5/1996 | Shimoda |
| 5,864,570 A | * | 1/1999 | Dorenbosch et al. ....... 714/704 |
| 5,864,861 A | * | 1/1999 | Williams ..................... 707/101 |
| 6,064,880 A | * | 5/2000 | Alanara ...................... 455/419 |
| 6,104,638 A | | 8/2000 | Larner et al. |
| 6,219,656 B1 | | 4/2001 | Cain et al. |
| 6,317,755 B1 | * | 11/2001 | Rakers et al. ............... 707/204 |
| 6,459,624 B1 | * | 10/2002 | Kuo ....................... 365/185.33 |

FOREIGN PATENT DOCUMENTS

| | | |
|---|---|---|
| EP | 1 031 929 A2 | 8/2000 |
| GB | 361 783 A | 10/2001 |
| JP | 7-168769 | 7/1995 |
| JP | 7-248978 | 9/1995 |
| JP | 10-177527 | 6/1998 |
| JP | 11-328982 | 11/1999 |
| JP | 2000-115346 | 4/2000 |
| JP | 2000-222292 | 8/2000 |

* cited by examiner

*Primary Examiner*—William Trost
*Assistant Examiner*—Danh Le
(74) *Attorney, Agent, or Firm*—Scully, Scott, Murphy & Presser

(57) ABSTRACT

In a user setting information management method, when a predetermined event occurs, user setting information stored in the built-in memory of a portable telephone is read out and saved in a backup flash memory. When the predetermined event is canceled, the user setting information saved in the flash memory is written in the built-in memory of the portable telephone. The flash memory is divided into a plurality of independently erasable blocks. Each divided block is divided into a user setting information area for writing user setting information to be backed up and a block management area for writing block management information for each block. A user setting information log representing a backup order is generated as block management information for each block. Pieces of block management information of all blocks are compared every occurrence of a predetermined event to identify a block having undergone oldest backup and a block having undergone newest backup. After data in the block having undergone oldest backup is erased, data is backed up in the erased block. Block management information of the erased/backup block is written in the block having undergone newest backup. A user setting information management system is also disclosed.

9 Claims, 4 Drawing Sheets

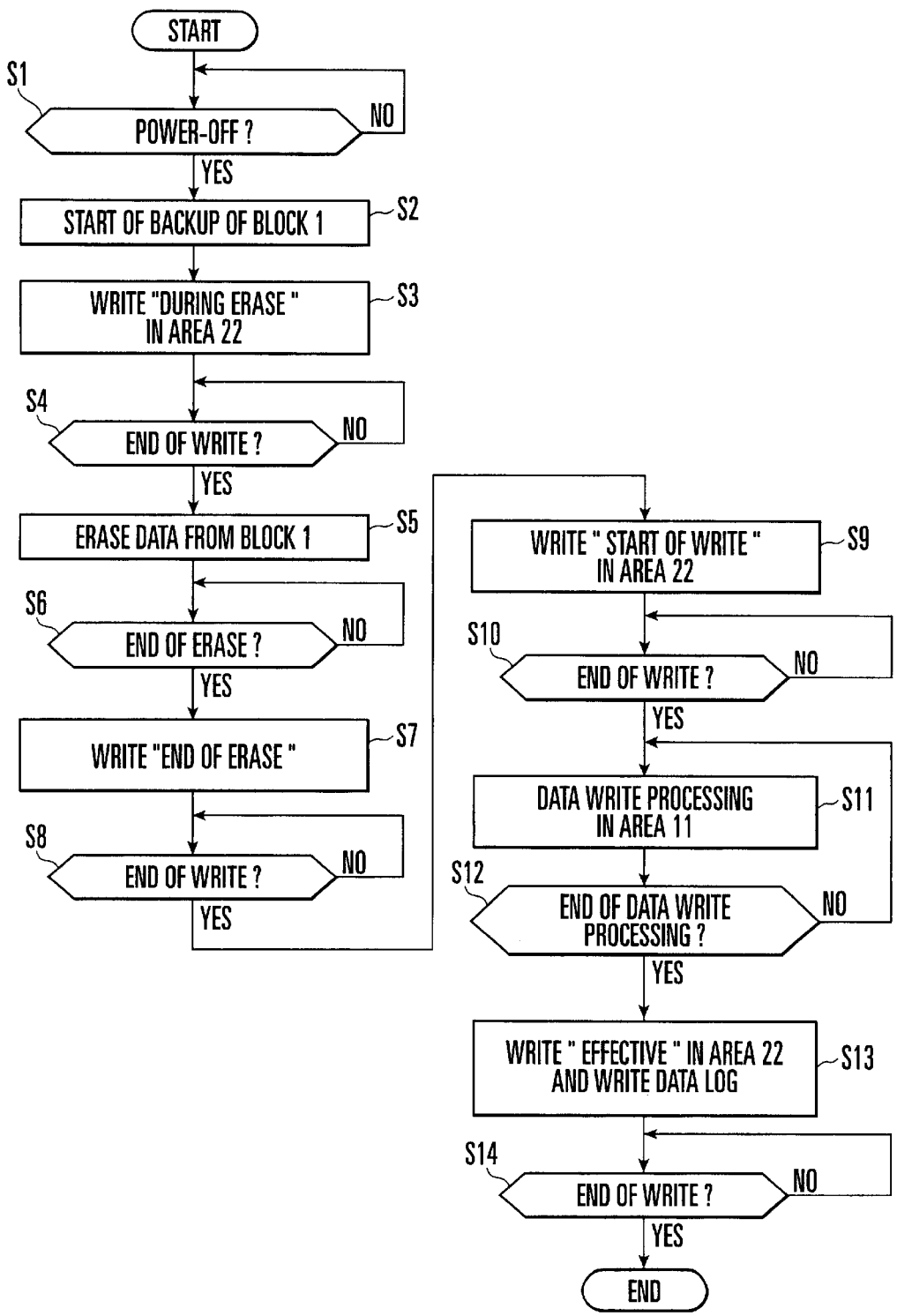
F I G. 3

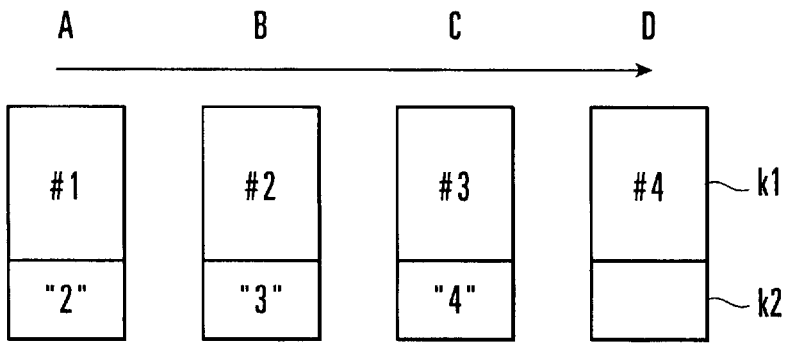
FIG.5A TIME T1
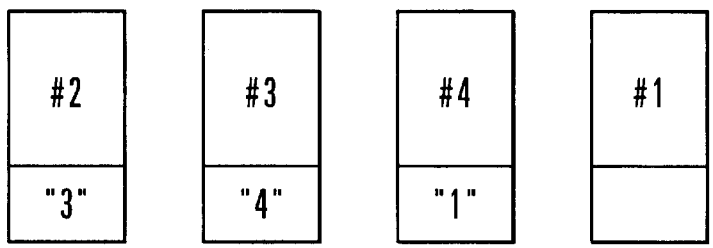
FIG.5B TIME T2
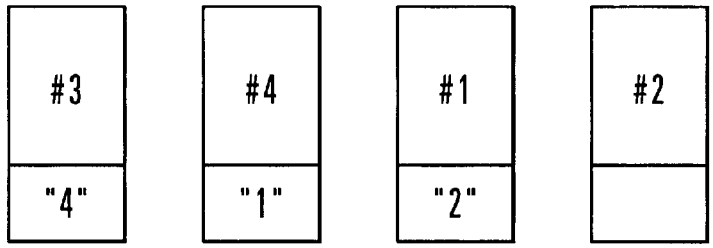
FIG.5C TIME T3
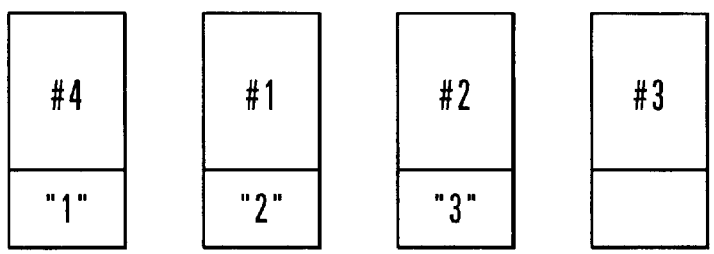
FIG.5D TIME T4

USER SETTING INFORMATION MANAGEMENT METHOD AND MANAGEMENT SYSTEM FOR PORTABLE TELEPHONE

BACKGROUND OF THE INVENTION

The present invention relates to a user setting information management method and management system which manage backup processing of, when a predetermined event occurs, generating a trigger for activating a backup program, reading out user setting information stored in the built-in memory of a portable telephone, saving it in a backup FROM, and when the event which has generated the trigger is canceled, writing the user setting information saved in the FROM in the built-in memory of the portable telephone.

In current portable telephones, information such as a telephone book input by the user is stored in an SRAM (Static Random Access Memory). The SRAM allows free read/write as its feature. However, the SRAM cannot hold data when the backup battery of the portable telephone is dead. If the backup battery is dead, data input by the user is lost, and the user must input them again.

To solve this problem, a flash EEPROM (Electrically Erasable Programmable Read Only Memory) is used for the memory dial of the portable telephone. The flash memory is nonvolatile, enables electrical write/erase, consumes small power, and provides a shorter access time than that of a hard disk. Data is backed up using an FROM which surely holds data. This prevents loss of data caused by a dead backup battery.

Japanese Patent Laid-Open No. 2000-115346 discloses a backup device using an FROM. The backup device disclosed in this reference is directly connected to the data communication connector of a portable telephone via a connector, and receives power from the portable telephone. Under the control of a single-chip microcomputer, the backup device reads out telephone number data from the portable telephone via the connector, stores it in the FROM, and writes telephone number data stored in the FROM into the portable telephone. The portable telephone is notified by a communication means of the end of reading out telephone number data from the portable telephone and writing telephone number data in the portable telephone.

Since the backup device receives power from the portable telephone, the backup device itself can be reduced in size and weight and can be carried together with the portable telephone.

This backup device is convenient when backup operation is normally performed. However, the FROM allows write of data from bit "1" to bit "0", but does not allow write from bit "0" to bit "1". Unlike the SRAM, the FROM does not support partial overwrite. To write data in which bits "1" and "0" irregularly appear, like user information data, new data cannot be written in the FROM unless existing data is erased.

Owing to this characteristic of the FROM, the latest data of the SRAM is also lost upon power-off when old backup data in the FROM is erased in order to back up the latest data in the SRAM. In this case, the latest data accumulated in the SRAM is also completely lost together with the old backup data in the FROM. Thus, the data cannot be reconstructed.

SUMMARY OF THE INVENTION

It is an object of the present invention to provide a user setting information management method and management system capable of preventing loss of data even upon power-off of an SRAM when data in an FROM is erased.

To achieve the above object, according to the present invention, there is provided a user setting information management method comprising the steps of, when a predetermined event occurs, reading out user setting information stored in a built-in memory of a portable telephone to save the user setting information in a backup flash memory, and when the predetermined event is canceled, writing the user setting information saved in the flash memory in the built-in memory of the portable telephone, the save step having the steps of dividing the flash memory into a plurality of independently erasable blocks, dividing each divided block into a user setting information area for writing user setting information to be backed up and a block management area for writing block management information for each block, generating a user setting information log representing a backup order as block management information for each block, comparing pieces of block management information of all blocks every occurrence of a predetermined event to identify a block having undergone oldest backup and a block having undergone newest backup, after data in the block having undergone oldest backup is erased, backing up data in the erased block, and writing block management information of the erased/backup block in the block having undergone newest backup.

BRIEF DESCRIPTION OF THE DRAWINGS

FIG. 3 is a flow chart showing FROM backup processing executed by a CPU in FIG. 1 upon power-off;

FIG. 4 is a flow chart showing SRAM expansion processing executed by the CPU in FIG. 1 upon power-on; and FIGS. 5A to 5D are views for explaining user setting information management procedures in a user setting information management system according to the second embodiment of the present invention.

DESCRIPTION OF THE PREFERRED EMBODIMENTS

The present invention will be described in detail with reference to the accompanying drawings.

Figure 1:
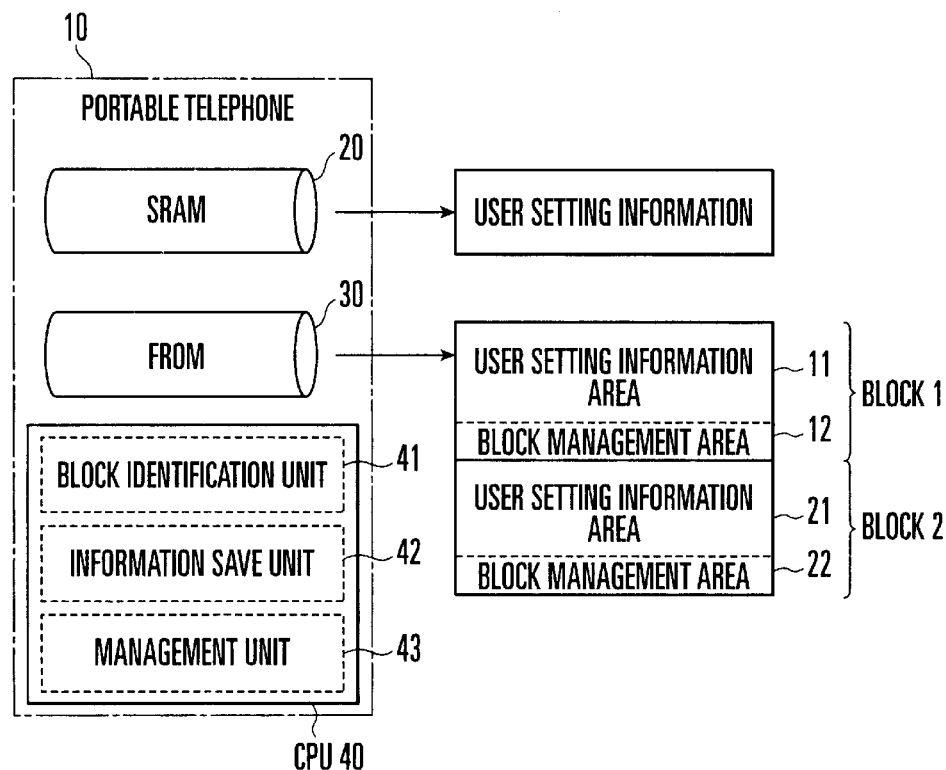
FIG. 1 is a block diagram showing a user setting information management system according to the first embodiment of the present invention.

FIG. 1 shows a user setting information management system according to the first embodiment of the present invention. In FIG. 1, a portable telephone 10 comprises an SRAM 20 for storing user setting information such as a telephone book, an FROM 30 for backing up information of the SRAM 20, and a CPU (Central Processing Unit) 40 for performing various control operations including information backup.

The memory area of the FROM 30 is divided into two independently erasable blocks 1 and 2. The blocks 1 and 2 are respectively constituted by user setting information areas 11 and 21 for backing up user setting information, and block management areas 12 and 22 in which management information is written for each block. The CPU 40 comprises a block identification unit 41 for identifying the information save logs of the blocks 1 and 2, an information save unit 42 for saving user setting information, and a management unit 43 for managing block management information.

In the following description, the block number is designated by k (k=1, 2), and areas in each block (user setting information area for backing up user setting information, and block management area) are designated by p (p=1, 2). In this case, p=1 means an area for backing up user setting information, and p=2 means a block management area. The p area of the k block is expressed by kp. The area 12 represents the block management area of the block 1, and the area 21 represents the user setting information area (to be referred to as a backup area hereinafter) of the block 2.

Figure 2:
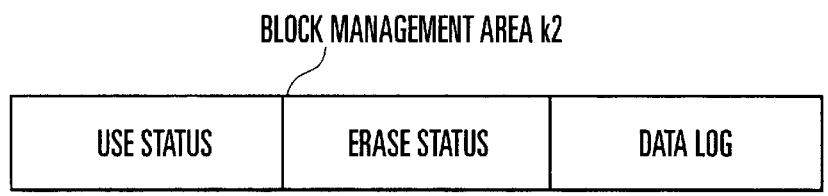
FIG. 2 is a view showing the block management area of an FROM shown in FIG. 1.

The block management area k2 (k=1, 2) of each block stores information about the use status, the erase status of the backup area, and the data log, as shown in FIG. 2. The "use status" means the use status of an erased backup area, i.e., the progress of write processing of writing backup data from the SRAM. In the first embodiment, the use status is expressed by upper two digits and lower two digits of a 4-digit hexadecimal number, as shown in Table 1.

TABLE 1

| Upper | Lower | Use Status |
| --- | --- | --- |
| FF | FF | Unused |
| FF | 00 | During write |
| 00 | 00 | Effective (end of write) |

In Table 1, "unused" is a state wherein data has been erased and data representing a use state such as "during write" or "effective" is not written. "Effective" means that write is completed without any trouble and written data can be used as backup data. The use status is given as 32-bit data because all bits in an unused state (erased state) are "1" (all "FF") as the characteristic of a flash memory. In addition, data can only be written in units of 32 bits.

The erase status represents the progress of erase processing for a target block. The erase status is expressed by three stages: "unused", "during erase", and "end of erase" as shown in Table 2.

TABLE 2

| Upper | Lower | Use Status |
| --- | --- | --- |
| FF | FF | Unused |
| FF | 00 | During erase |
| 00 | 00 | End of erase |

The data log is data for managing the data order of backup data, and is incremented from "0001h" to "FFFEh" every write. "FFFEh" means an unused state, and "0001h" means the first written state. After "FFFEh", the data log returns to "0001h".

Block management data of the block 2 is written in the block management area 12 of the block 1, and block management data of the block 1 is written in the block management area 12 of the block 2. This is because block management according to the present invention is to manage erase of each block and write of backup data after erase. The block management area of a block to be erased does not allow writing erase/write information of this block.

The CPU 40 of the portable telephone 10 copies user setting information from the SRAM 20 to an older one (subjected to backup at earlier time) of the two blocks as a target backup block that is judged from the data log of the FROM 30 upon power-off. Upon power-on, the CPU 40 expands, in the user setting information area of the SRAM 20, user setting information accumulated in a newer one (subjected to latest backup) of the two blocks that is judged from the data log of the FROM.

The operation of the user setting information management system having this arrangement will be explained with reference to FIGS. 3 and 4.

FROM backup processing executed by a backup program activated by power-off will be described. A case wherein an "older" block is the block 1 on the basis of the data logs of the two blocks 1 and 2 in the FROM will be described. At time when the backup program is activated, block management information of the block 2 is saved in the block management area 12 of the block 1, but the block management area 22 of the newer block 2 is unused. This is because the block management area 22 is cleared by erase processing executed before user setting information is newly backed up in the block 2.

Backup data is saved in the older block, i.e., block 1. Block management information about erase and backup of the block 1 is written in the block management area 22 (currently unused) of the block 2. In this manner, information is backed up in the older block because, even if backup fails due to power-off before the completion of backup that is caused by removal of a battery during backup, the latest backup data saved in the newer block 2 can be used.

In FIG. 3, if power-off is detected (YES in step S1), the block identification unit 41 of the CPU 40 determines that the block 1 is an older block, and starts backup processing for the block 1 (step S2). The CPU 40 writes "FF00" representing "during erase" in the erase status field of the block management area 22 of the block 2 (step S3). If write of "during erase" is completed (YES in step S4), the CPU 40 erases data in the block 1 (step S5). If erase is completed (YES in step S6), the CPU 40 writes "0000" representing "end of erase" in the erase status field of the block management area 22 (step S7). If write of "end of erase" is completed (YES in step S8), the CPU 40 writes "start of write" in the use status field of the block management area 22 (step S9).

If write is completed (YES in step S10), the information save unit 42 of the CPU 40 writes data of the SRAM in the user setting information area 11 of the block 1 (step S11). If data write is completed (YES in step S12), the management unit 43 of the CPU 40 writes "0000" representing "effective (end of write)" in the use status field of the block management area 22, and writes the number of backup operations counted up by "1" in a data log field (step S13). If write of "effective" and write of the data log are completed (YES in step S14), backup processing ends.

SRAM expansion processing upon power-on will be described. A case wherein the block 1 is a newer block on the basis of the data logs of the two blocks in the FROM will be described. The block 1 is determined to be a "newer" one as a result of backup processing shown in FIG. 3. At this time, the block management area 12 of the block 1 is unused because of erase processing executed on the initial stage of backup processing.

Figure 4:
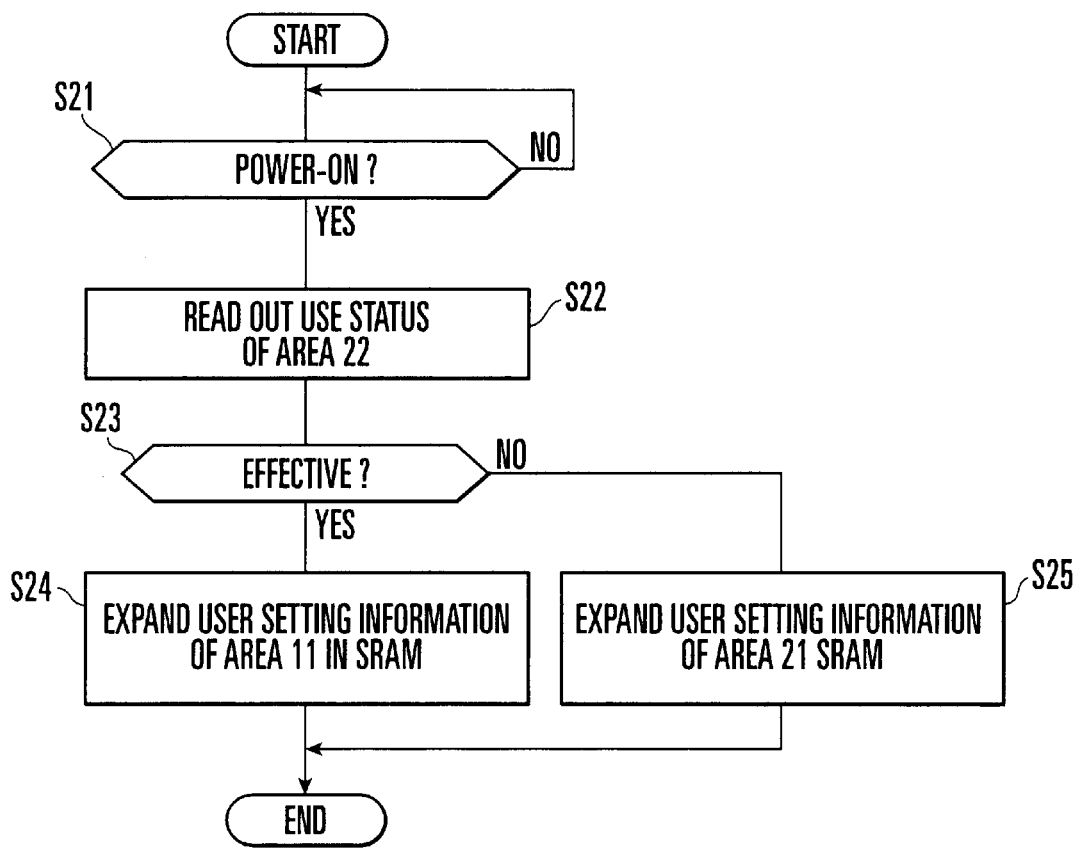

In FIG. 4, if the CPU 40 of the portable telephone 10 determines that the power supply is turned on (step S21), it reads out the use status of the block management area 22 (step S22). If the use status of the block management area 22 is "0000" representing "effective" (end of write) (YES in step S23), the CPU 40 expands data of the user setting information area 11 of the block 1 in the SRAM 20 (step S24). If NO in step S23, the CPU 40 expands data of the user setting information area 21 of the block 2 in the SRAM 20 (step S25). Then, SRAM expansion processing upon power-on ends.

According to the first embodiment, when a backup program is triggered, data in a block having undergone backup processing at earlier time is erased, and backup processing is executed for this block. Even if this backup processing fails, user setting information saved in a block having undergone latest backup processing can be used. Even if backup fails, user setting information is not lost.

Backup may be performed not only upon power-off but also at the start of charge. In this case, even a portable telephone which is hardly turned off by the user can back up user setting information such as a telephone book.

The second embodiment of the present invention will be described. In the first embodiment, the number k of blocks=2. In the second embodiment, the number k of blocks is increased to an arbitrary integer n (n>k). Also in this embodiment, the block management area of each block has the same format as that shown in FIG. 2. However, contents written in each field are expanded.

In the first embodiment, data in an "older" block (to be referred to as a first block) of two blocks is erased, and backup data is written in this block. At time when the backup data is written, the block management area of the first block is unused. After backup, the first block becomes a "newer" block, and has the user setting information area newly storing the backup data and the unused block management area. The second block, which has first been a "newer" block, becomes an "older" block after the backup data is written in the first block.

The next erase processing is performed for the second block, and block management information in the second block is written in the block management area (currently unused) of the first block.

This description is adopted for the number k of blocks=n as follows.

In the second embodiment, data in the "oldest" block (to be referred to as a first block) among n blocks is erased, and backup data is written in this block. At time when the backup data is written, the block management area of the first block is unused. After backup, the first block becomes the "newest" block, and has the user setting information area newly storing the backup data and the unused block management area. The second block, which has first been the "newest" block, becomes the second newest block after the backup data is written in the first block.

The next erase processing is performed for the currently oldest block, and block management information in the currently oldest block is written in the block management area (currently unused) of the first block which is the currently newest block.

FIGS. 5A to 5D show the concept of the second embodiment for k=4. In FIGS. 5A to 5D, user setting information areas k1 (k=1 to 4) of blocks #1 to #4 store their user setting information, and block management areas k2 (k=1 to 4) store block management information of blocks other than themselves. For example, in FIG. 5A, user setting information of the block #1 is written in the user setting information area k1 of the block #1, and block management information of the block #2 is written in the block management area k2 of the block #1.

A, B, C, and D represent the "newness" of the blocks. Blocks on column A are the oldest (blocks having undergone erase and backup first), and blocks on column D are the newest. Since the block management area k2 of the latest block is unused and blank. T1, T2, T3, and T4 represent times at which erase and backup are executed (power-off times).

At time T1, the block #4 is the newest, and the block #1 is the oldest, as shown in FIG. 5A. Pieces of block management information of the blocks #2, #3, and #4 are written in the block management areas k2 of the blocks #1, #2, and #3, the reason of which will be apparent from the following description.

At time T2, the power supply is turned off. Data in the block #1 which is the oldest at time T1 is erased, block management information written in its block management area k2 is also erased, and the block management area k2 becomes unused, as shown in FIG. 5B. Then, user setting information of the block #1 is written from an SRAM 20 in the user setting information area k1 of the block #1. This backup processing makes the block #1 the newest block. Block management information about the block #1 in this processing is written in the block management area k2 of the block #4 which is unused at time T1.

By power-off at time T2, the block #1 becomes the newest block (block management area k2 is blank), and the block #4 storing the block management information about the block #1 becomes the second newest block. In accordance with this, the blocks #3 and #2 become older blocks.

The same processing is done when the power supply is turned off at times T3 and T4 (FIGS. 5C and 5D). By power-off operations at times T1 to T4, pieces of block management information are written in the block management areas k2 of the blocks #1 to #4, as shown in FIGS. 5A to 5D.

Even when backup processing fails due to any reason during backup processing for the block #1 upon power-off at time T2, the user setting information saved in the second newest block #4 can be supplied to the SRAM 20 after power-on.

As has been described above, according to the present invention, an FROM is alternately used between multiple planes (multiple blocks), and user setting information is backed up on one plane of the flash memory upon power-off. Even if backup to this plane fails, user setting information saved in another plane can be used. As a result, user setting information can be securely held.

When a predetermined event such as power-off occurs, a backup program is automatically activated. User setting information can be stored in the FROM without user's consciousness of backup. Hence, user setting information can be reliably held against a dead backup battery of which the user is unconscious.

What is claimed is:

1. A user setting information management method comprising the steps of:
   when a predetermined event occurs, reading out user setting information stored in a built-in memory of a portable telephone to save the user setting information in a backup flash memory; and
   when the predetermined event is canceled, writing the user setting information saved in the flash memory in the built-in memory of the portable telephone,
   the save step having the steps of:
   dividing the flash memory into a plurality of independently erasable blocks;
   dividing each divided block into a user setting information area for writing user setting information to be backed up and a block management area for writing block management information for each block;
   generating a user setting information log representing a backup order as block management information for each block;
   comparing pieces of block management information of all blocks every occurrence of a predetermined event to identify a block having undergone oldest backup and a block having undergone newest backup;

after data in the block having undergone oldest backup is erased, backing up data in the erased block; and writing block management information of the erased/backup block in the block having undergone newest backup.

2. A method according to claim 1, wherein the method further comprises the step of counting the number of backup operations for each block, and the identification step includes the steps of:

determining a block exhibiting the smallest number of backup operations as a block having undergone oldest backup; and determining a block exhibiting the largest number of backup operations as a block having undergone newest backup.

3. A method according to claim 1, wherein the predetermined event includes power-off of the built-in memory of the portable telephone.

4. A method according to claim 1, wherein the predetermined event includes start of power charge of the portable telephone.

5. A user setting information management system comprising:

a built-in memory which is incorporated in a portable telephone and stores user setting information;

a flash memory in which the user setting information of said built-in memory is backed up; and processing control means for, when a predetermined event occurs, saving the user setting information stored in said built-in memory of the portable telephone in said flash memory, and when the predetermined event is canceled, writing the user setting information saved in said flash memory in said built-in memory of the portable telephone, wherein said flash memory is divided into a plurality of independently erasable blocks, each divided block is divided into a user setting information area for writing user setting information to be backed up and a block management area for writing block management information including a user setting information log representing a backup order for each block, and said processing control means includes:

block identification means for comparing pieces of block manage information of all blocks every occurrence of a predetermined event to identify a block having undergone oldest backup and a block having undergone newest backup;

information save means for erasing data in the block having undergone oldest backup and backing up data in the erased block; and management means for writing block management information of the erased/backup block in the block having undergone newest backup.

6. A system according to claim 5, wherein said identification means determines a block exhibiting the smallest number of backup operations as a block having undergone oldest backup for each block, and determines a block exhibiting the largest number of backup operations as a block having undergone newest backup.

7. A system according to claim 5, wherein the predetermined event includes power-off of said built-in memory of the portable telephone.

8. A system according to claim 5, wherein the predetermined event includes start of power charge of the portable telephone.

9. A system according to claim 5, wherein the block management area includes a first field representing a data log, a second field representing progress of erase for a block during erase/backup, and a third field representing progress of backup performed after completion of erase.

* * * * *